(12) United States Patent
Tang et al.

(10) Patent No.: US 11,150,999 B2
(45) Date of Patent: Oct. 19, 2021

(54) METHOD, DEVICE, AND COMPUTER PROGRAM PRODUCT FOR SCHEDULING BACKUP JOBS

(71) Applicant: EMC IP Holding Company LLC, Hopkinton, MA (US)

(72) Inventors: Jun Tang, Chengdu (CN); Wei Wang, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/794,720

(22) Filed: Feb. 19, 2020

(65) Prior Publication Data
US 2021/0117280 A1    Apr. 22, 2021

(30) Foreign Application Priority Data
Oct. 21, 2019    (CN) .......................... 201911001247.4

(51) Int. Cl.
*G06F 11/14*    (2006.01)
*G06F 9/54*    (2006.01)

(52) U.S. Cl.
CPC .......... *G06F 11/1461* (2013.01); *G06F 9/546* (2013.01); *G06F 11/1451* (2013.01); *G06F 11/1464* (2013.01); *G06F 11/1469* (2013.01)

(58) Field of Classification Search
CPC ............ G06F 11/1464; G06F 11/1461; G06F 11/1469; G06F 11/1451; G06F 9/546; H04L 41/5003
USPC ........................................................ 714/4.11
See application file for complete search history.

(56) References Cited

U.S. PATENT DOCUMENTS

| | | | |
|---|---|---|---|
| 11,010,116 B1* | 5/2021 | Kopparthi | G06F 3/122 |
| 2019/0243683 A1* | 8/2019 | Botelho | G06F 3/067 |

* cited by examiner

*Primary Examiner* — Yair Leibovich
(74) *Attorney, Agent, or Firm* — Womble Bond Dickinson (US) LLP (57) ABSTRACT

Embodiments of the present disclosure relate to a method, device, and computer program product for scheduling backup jobs. There is provided a method of scheduling backup jobs, comprising: in response to detecting that a target backup job is generated, obtaining predetermined execution information of the target backup job; determining an execution priority of the target backup job based on the predetermined execution information of the target backup job; determining an execution priority of an existing backup job in a waiting queue; and adding the target backup job to the waiting queue based on the execution priority of the existing backup job and the execution priority of the target backup job. Through embodiments of the present disclosure, it enables better utilization of system resources to achieve the Recover Point Objective for important data, ensuring a Service Level Agreement.

20 Claims, 5 Drawing Sheets

METHOD, DEVICE, AND COMPUTER PROGRAM PRODUCT FOR SCHEDULING BACKUP JOBS

CROSS-REFERENCE TO RELATED APPLICATION

This patent application claims priority, under 35 U.S.C. § 119, of Chinese Patent Application No. 201911001247.4, filed Oct. 21, 2019, which is incorporated by reference herein in its entirety.

FIELD

Embodiments of the present disclosure generally relate to the field of information processing, and more specifically to a method, device, and computer program product for scheduling backup jobs.

BACKGROUND

In current data protection systems, scheduling of backup jobs is merely according to a time specified by an administrator. However, due to the increase of system workload, it is often impossible to back up data at the expected time, and it is difficult to know the time required to actually complete the backup job. Therefore, a RPO (Recover Point Objective) of the data to be protected cannot be guaranteed. Although users think they have protected the data, a true backup service level might not reach an expected level. As existing solutions cannot solve the problem, having to leave the backup job run until finished, users cannot ensure that their important assets are protected as planned.

SUMMARY

Embodiments of the present disclosure provide a method, device, and computer program product for scheduling backup jobs.

In a first aspect of the present disclosure, a method of scheduling backup jobs is provided. The method comprises: in response to detecting that a target backup job is generated, obtaining predetermined execution information of the target backup job; determining an execution priority of the target backup job based on the predetermined execution information of the target backup job; determining an execution priority of an existing backup job in a waiting queue; and adding the target backup job to the waiting queue based on the execution priority of the existing backup job and the execution priority of the target backup job.

In a second aspect of the present disclosure, an electronic device is provided. The device comprises: at least one processing unit; at least one memory, coupled to the at least one processing unit and storing instructions executed by the at least one processing unit, the instructions, when executed by the at least one processing unit, causing the device to perform acts, the acts comprising: in response to detecting that a target backup job is generated, obtaining predetermined execution information of the target backup job; determining an execution priority of the target backup job based on the predetermined execution information of the target backup job; determining an execution priority of an existing backup job in a waiting queue; and adding the target backup job to the waiting queue based on the execution priority of the existing backup job and the execution priority of the target backup job.

In a third aspect of the present disclosure, a computer program product is provided. The computer program product is tangibly stored on a non-transitory computer-readable medium and comprises machine-executable instructions. The machine-executable instructions, when executed by a device, cause the device to perform any step of the method according to the first aspect of the present disclosure.

This Summary is provided to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

Through the more detailed description of example embodiments of the present disclosure with reference to the accompanying drawings, the above and other objectives, features and advantages of the present disclosure will become more apparent, in which the same reference numerals typically refer to the same components in the example embodiments of the present disclosure.

Throughout the figures, the same or corresponding numerals denote the same or corresponding parts.

DETAILED DESCRIPTION OF EMBODIMENTS

Some preferred embodiments will be described in more detail below with reference to the accompanying drawings. Although the preferred embodiments of the present disclosure are illustrated in the drawings, it should be appreciated that the present disclosure can be implemented in various manners, and thus should not be construed to be limited to embodiments disclosed herein. Rather, these embodiments are provided to disclose the present disclosure more thoroughly and completely, and to convey the scope of the present disclosure fully to those skilled in the art.

As used herein, the terms "comprise" and its variants are to be read as open-ended terms that mean "include, but is not limited to." Unless otherwise specified, the term "or" is to be read as "and/or." The term "based on" is to be read as "based at least in part on". The terms "one example embodiment" and "one embodiment" are to be read as "at least one embodiment." The term "another embodiment" is to be read as "at least one other embodiment." The terms "first," "second" and the like may refer to different or the same objects. Other definitions, explicit and implicit, might be included below.

In current data protection systems, backup jobs are scheduled by a system administrator specifying the backup time.

As it is difficult to know how much time is required to complete all scheduled jobs, such scheduling will lead to no guarantee for completing all backup jobs as planned. For example, if the backup period in a data protection system is set as two hours, however, there are many backup jobs requiring more than 2 hours. As such, subsequent backup jobs have to be postponed.

Currently, there is no solution to solve the problem, having to leave the backup job running until finished. This might lead to a serious problem: important data to be protected will all fail to meet a Recover Point Objective (RPO) because the system resource is occupied by the jobs with long execution time. For example, although the administrator specifies that backup for a critical dataset should be performed at an interval of time (e.g., every 15 minutes), the expected backup every 15 minutes cannot be achieved, because when the expected backup time comes, the system is still occupied by the running previous backup jobs, since the previous backup jobs need to take hours to complete. In addition, if backup jobs fill up a job queue, then performance of the system drops dramatically.

Embodiments of the present disclosure propose a solution for scheduling backup jobs to solve one or more of the above problems and other potential problems. According to this solution, by setting execution priorities of backup jobs and sorting backup jobs according to the execution priorities, it is ensured that more important assets are protected as much as possible, system resources are better utilized to achieve the Recover Point Objective (RPO) for important data, thereby ensuring a Service Level Agreement (SLA).

Figure 1:
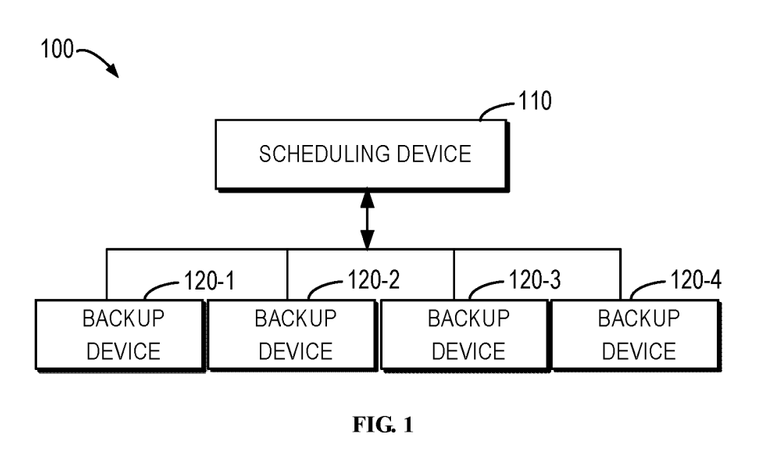
FIG. 1 illustrates a block diagram of an example backup system in which embodiments of the present disclosure can be implemented.

FIG. 1 illustrates a block diagram of an example backup system 100 in which embodiments of the present disclosure can be implemented. As shown in FIG. 1, the backup system 100 includes a scheduling device 110 and one or more backup devices 120-1 to 120-4 (collectively referred to as backup device 120). Various methods according to embodiments of the present disclosure may be implemented at the scheduling device 110. It should be understood that the structure of the backup system 100 is described for exemplary purposes only, and does not imply any limitation on the scope of the present disclosure. For example, the embodiments of the present disclosure can also be applied to a system different from the backup system 100. It should be understood that the specific number of various devices is given for illustrative purposes only and does not imply any limitation on the scope of the disclosure. For example, embodiments of the present disclosure may also be applied to more or fewer devices.

The scheduling device 110 is a device that determines a priority of a backup job and schedules the backup job according to the priority. In some embodiments, the backup job may be, for example, a job that is generated according to a predetermined policy, and specifies when to perform a backup on which device or devices. The scheduling device 110 may be, for example, a computer, a virtual machine, a server, or the like, and the present disclosure is not limited in this regard. The backup device 120 is a device that stores data, assets, and the like to be protected, and performs backup jobs thereon. The backup device 120 may be, for example, a computer, a virtual machine, a server, or the like, and the present disclosure is not limited in this regard. The scheduling device 110 and the backup device 120 communicate with each other through a network which may be, for example, an Internet, an intranet, or the like.

Figure 2:
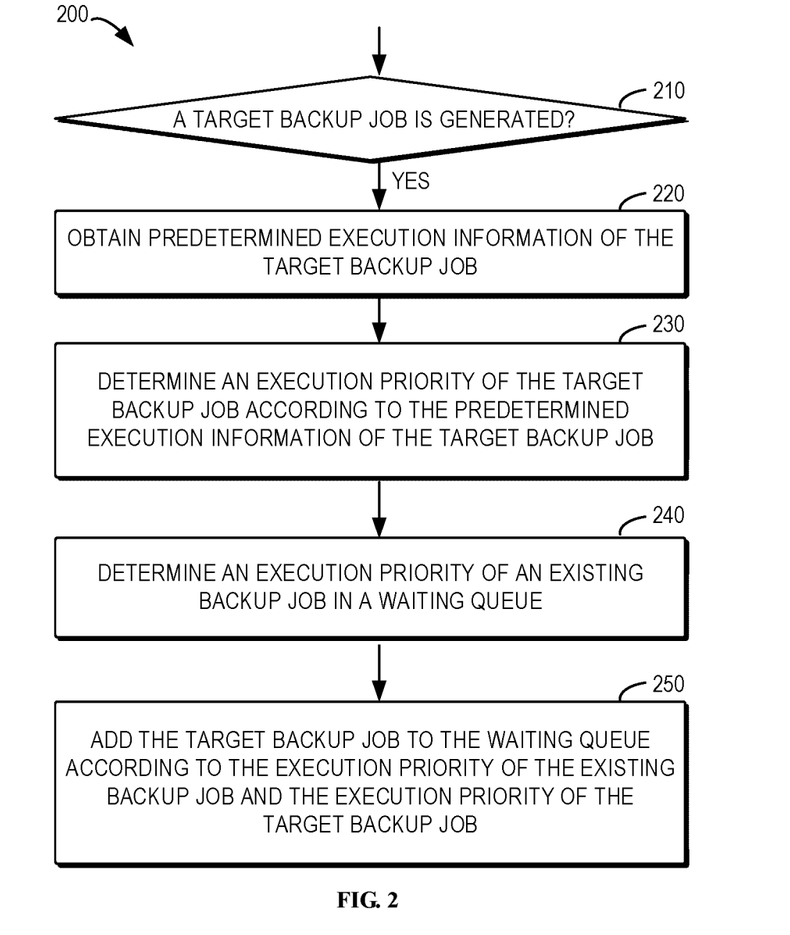
FIG. 2 illustrates a flowchart of an example method of scheduling backup jobs according to an embodiment of the present disclosure.

FIG. 2 illustrates a flowchart of an example method 200 of scheduling backup jobs according to an embodiment of the present disclosure. For example, the method 200 may be performed by the scheduling device 110 as shown in FIG. 1. It should be understood that the method 200 may also be performed by other devices, and the scope of the present disclosure is not limited in this regard. It should also be understood that the method 200 may also include additional acts not shown and/or the acts shown may be omitted, and the scope of the present disclosure is not limited in this regard.

The method 200 is described in detail below with reference to FIG. 1 and FIG. 2.

The scheduling device 110 may generate a backup job. In some embodiments, the scheduling device 110 may generate a backup job according to a predetermined policy, and the predetermined policy may specify a time to generate the backup job. Alternatively or additionally, in other embodiments, the scheduling device 110 may generate the backup job based on input from a system administrator or a user. As mentioned above, a backup job may specify when to back up which data on which devices.

At 210, the scheduling device 110 detects whether a target backup job is generated. In some embodiments, the scheduling device 110 may periodically detect whether a target backup job is generated. Alternatively or additionally, in other embodiments, the scheduling device 110 may receive a notification when a target backup job is generated.

If the scheduling device 110 detects that a target backup job is generated, the scheduling device 110 obtains predetermined execution information of the target backup job at 220.

In some embodiments, the predetermined execution information may be a predetermined priority of the target backup job specified by the user. Additionally, in some embodiments, the predetermined priority may be an integer. For example, the predetermined priority may be any integer in a range from 1 to 10.

Additionally or alternatively, in other embodiments, the predetermined execution information may be a predetermined execution interval of the target backup job specified by the user. In some embodiments, the predetermined execution interval indicates the importance level of the data. It is easy to understand that the smaller the predetermined execution interval is, the more important the data to be backed up is. For example, the predetermined execution interval may be any time interval in a range from 15 minutes to 1 month.

Additionally or alternatively, in still other embodiments, the predetermined execution information may be a predicated execution duration of the target backup job. Although it is difficult to estimate the execution duration of the backup job accurately, the execution duration of the backup job may be estimated relatively accurately by some methods. For example, the execution duration may be estimated by using an Autoregressive Integrated Moving Average (ARIMA) model, according to historical data of backup job execution. Then, a prediction equation may be used to calculate the job execution time for the current time. It should be understood that the method of estimating the execution duration of the backup job is described for exemplary purposes only, and does not imply any limitation on the scope of the present disclosure. For example, the execution duration of the backup job may also be estimated by other methods, and the present disclosure is not limited in this regard.

At 230, the scheduling device 110 determines an execution priority of the target backup job according to the predetermined execution information of the target backup job.

In some embodiments, the scheduling device 110 may obtain an adjustment parameter for the predetermined execution information of the target backup job, and determine the execution priority of the target backup job according to the predetermined execution information of the target backup job and the adjustment parameter. The adjustment parameter indicates the influence of different predetermined execution information on the execution priority to be determined. The method of determining the execution priority of the target backup job in some embodiments will be described in detail later.

At 240, the scheduling device 110 determines an execution priority of an existing backup job in a waiting queue.

In some embodiments, similar to what is described above with respect to the target backup job, the scheduling device 110 may obtain predetermined execution information of the existing backup job in the waiting queue. Similarly, similar to what is described above with respect to the target backup job, the predetermined execution information of the existing backup job may be a predetermined priority and/or a predetermined execution interval and/or a predicated execution duration of the existing backup job. Detailed description will not be repeated here.

Additionally, in other embodiments, the scheduling device 110 may further determine a waiting time period of the existing backup job in the waiting queue. In some embodiments, the waiting time period may be set as an increment between a current timestamp of the system and a time when the existing backup job is created.

Additionally, in still other embodiments, the scheduling device 110 may obtain adjustment parameters for the waiting time period and the predetermined execution information of the existing backup job.

A model for determining the execution priority of an existing backup job in the waiting queue in some embodiments is described in details below:

$$Pr = Pc \times 10 + a * \log R + b * \log B - c * \log W$$

$$Pc \in R | 1 \leq Pc \leq 10$$

$$R \in N | 15 \leq R \leq 44640$$

$$B \in N | 0 < B \leq 44640$$

$$W \in N | 0 \leq W \leq 44640$$

$$0 < a < 1; 0 < b < 1; 0 < c < 1; a + b + c = 1 \quad (1)$$

where Pr represents an execution priority to be determined, Pc represents a predetermined priority of the backup job, R represents a predetermined execution interval, B represents a predicated execution duration, W represents a waiting time period, and a, b, c are adjustment parameters for the predetermined execution interval, the predicated execution duration and the waiting time period, respectively.

In the described embodiment, according to the value range of each variable in Equation (1), when Pc is an integer, the resulting interval of values of Pc×10 is 10, and the resulting maximum value of a*log R+b log B−c log W is less than 10. Therefore, a higher predetermined priority results in a higher execution priority. Only when a plurality of backup jobs have the same predetermined priority, the scheduling device 110 determines the execution priorities of the plurality of backup jobs according to the predetermined execution interval, the predicated execution duration and the waiting time period. In addition, it can be seen from Equation (1) that the execution priority is positively correlated with the predetermined execution interval, positively correlated with the predicated execution duration, and negatively correlated with the waiting time period. Therefore, a smaller predetermined execution interval, a shorter predicated execution duration and a longer waiting time period will result in a higher execution priority. It should be understood that the value range of each variable in Equation (1) is defined for exemplary purposes only, and does not imply any limitation on the scope of the present disclosure. For example, each variable in the Equation (1) may also be defined as having other value ranges, and the present disclosure is not limited in this regard.

A model applicable for determining the execution priority of the target backup job in the embodiment is similar to Equation (1), except that the term c K log W corresponding to the waiting time period does not exist.

In an embodiment, the model for determining the execution priority of the existing backup job may be described as:

$$Pr = Pc \times 10 + 0.07 * \log R + 0.78 * \log B - 0.15 * \log W \quad (2)$$

where the values of a, b and c are obtained by evaluating the execution results of a large number of backup jobs. In some embodiments, the execution results of the backup jobs are evaluated in the following manner: if the execution of the backup job satisfies the SLA, a value 1 is returned; if the execution of the backup job does not satisfy the SLA, a value 0 is returned. Then, an adjustment parameter that gives a better priority may be determined according to a sum of values returned by a large number of backup jobs. For example, the larger the sum of values returned is, the better the corresponding adjustment parameter is. Additionally, in some embodiments, a backup job that is completed within a specified expected time period is considered as satisfying the SLA.

At 250, the scheduling device 110 adds the target backup job to the waiting queue according to the execution priority of the existing backup job and the execution priority of the target backup job.

In some embodiments, the scheduling device 110 may sort the target backup job and the existing backup job according to the execution priority of the existing backup job and the execution priority of the target backup job, and then add the target backup job into the waiting queue according to a result of the sorting. Additionally, in some embodiments, the scheduling device 110 may sort the execution priorities of the existing backup job and the target backup job from highest to lowest, and then insert the target backup job to a proper position in the waiting queue according to the sorting.

Additionally, in some embodiments, the scheduling device 110 may perform the sorting by using an insertion sort algorithm because the waiting queue is relatively ordered, and using the insertion sort algorithm may save time complexity. It should be understood that the insertion sort algorithm is used for sorting for exemplary purposes only, and does not imply any limitation on the scope of the present disclosure. For example, other sorting algorithms may also be used, and the present disclosure is not limited in this regard.

In the above exemplary embodiments, the target backup job and the existing backup jobs in the waiting queue are sorted according to their execution priorities, so that a backup job with a higher execution priority may be executed earlier, enabling as much data as possible to reach the Recover Point Objective (RPO) depending on actual system performance and ensuring the Service Level Agreement (SLA).

Figure 3:
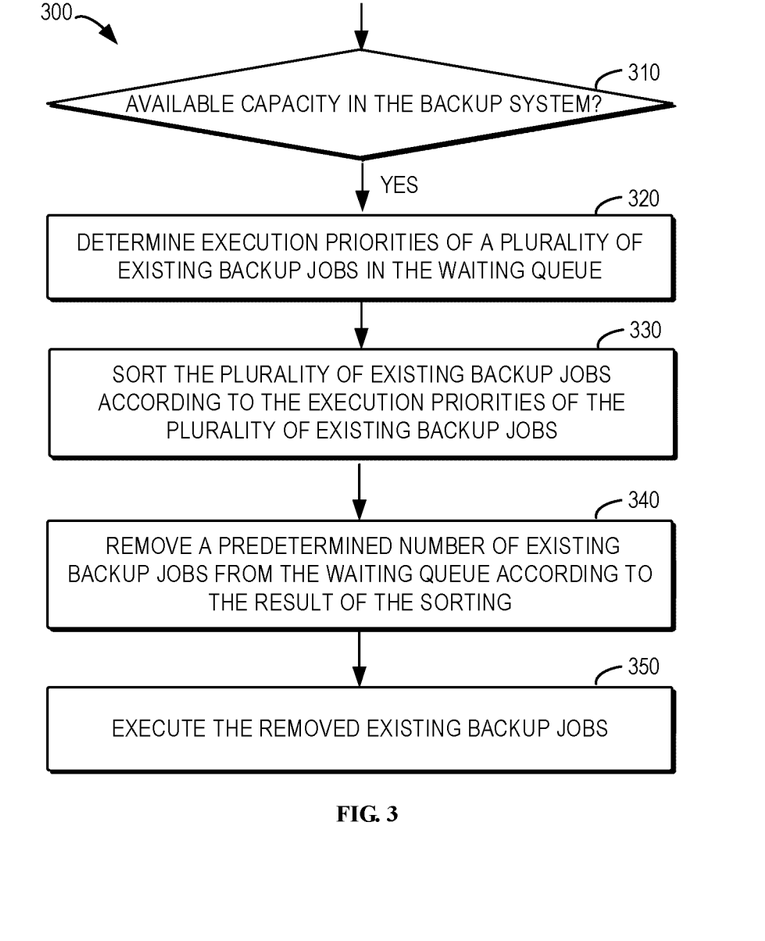
FIG. 3 illustrates a flowchart of an example method of scheduling backup jobs according to an embodiment of the present disclosure.

FIG. 3 illustrates a flowchart of an example method 300 of scheduling backup jobs according to an embodiment of the present disclosure. For example, the method 300 may be performed by the scheduling device 110 as shown in FIG. 1. It should be understood that the method 300 may also be performed by other devices, and the scope of the present disclosure is not limited in this regard. It should also be understood that the method 300 may also include additional acts not shown and/or the acts shown may be omitted, and the scope of the present disclosure is not limited in this regard.

At 310, the scheduling device 110 determines whether there is an available capacity in the backup system 100. In some embodiments, the scheduling device 110 periodically detects whether there is an available capacity to perform a backup job.

If the scheduling device 110 determines that there is an available capacity in the backup system 100 at 310, it determines the execution priorities of a plurality of existing backup jobs in the waiting queue at 320. This step is generally the same as that described above with respect to 240, and is not repeated here.

Additionally, in some embodiments, in order to reduce the calculation complexity, the scheduling device 110 may determine a value related to the predetermined execution information of the existing backup job in advance, and then only calculate the term related to the waiting time period of the existing backup job, namely, c K log Win Equation (1) when the waiting queue needs to be sorted. This is because the predetermined execution information for each backup job is predetermined and unchanged, whereas the waiting time period in the waiting queue changes as time elapses. Therefore, the scheduling device 110 may use the previously determined execution priority and the current waiting time period to re-determine the current execution priority without recalculating all of the terms.

At 330, the scheduling device 110 sorts a plurality of existing backup jobs according to the execution priorities of the plurality of existing backup jobs. The sorting method has been mentioned when describing 250 above, and is not repeated any more here.

At 340, the scheduling device 110 removes a predetermined number of existing backup jobs from the waiting queue according to the result of the sorting. In some embodiments, the scheduling device 110 may sort the existing backup jobs in the waiting queue from highest to lowest of the execution priorities, and then remove a predetermined number of existing backup jobs ranking the topmost from the waiting queue. Additionally, in some embodiments, the predetermined number is determined according to the detected available capacity in the backup system 100. Additionally, in some embodiments, a predetermined number of existing backup jobs with higher rank may be moved from the waiting queue to an execution queue.

At 350, the scheduling device 110 executes the removed existing backup jobs. In some embodiments, the executed backup jobs report their progress and status to the scheduling device 110. Additionally or alternatively, in other embodiments, the backup jobs completed are stored in a job repository. Additionally, in still other embodiments, the information of completed backup jobs in the job repository may be used to determine the predicated execution duration and optimize the adjustment parameters.

In the above exemplary embodiments, the backup system may execute an appropriate number of backup jobs when detecting that there is an available capacity, and update the execution order of the backup jobs according to the waiting time period of the backup jobs in the waiting queue at that time, thereby achieving the purpose of dynamically adjusting the sorting of the backup jobs.

Figure 4:
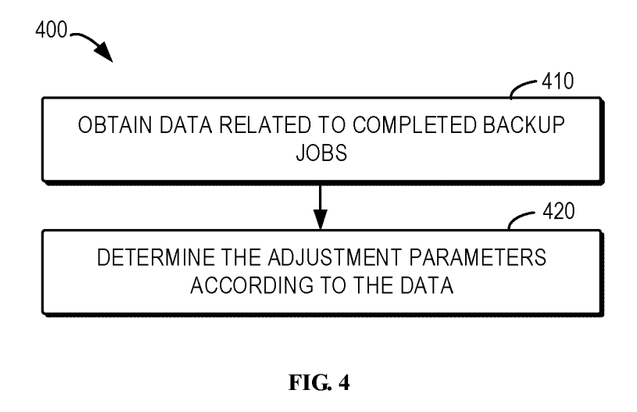
FIG. 4 illustrates a flowchart of an example method of determining adjustment parameters used for the scheduling of backup jobs according to an embodiment of the present disclosure.

FIG. 4 illustrates a flowchart of an example method 400 of determining adjustment parameters used for the scheduling of backup jobs according to an embodiment of the present disclosure. For example, the method 400 may be performed by a scheduling device 110 as shown in FIG. 1. It should be understood that the method 400 may also be performed by other devices, and the scope of the present disclosure is not limited in this regard. It should also be understood that the method 400 may also include additional acts not shown and/or the acts shown may be omitted, and the scope of the present disclosure is not limited in this regard.

At 410, the scheduling device 110 obtains data related to completed backup jobs.

In some embodiments, the scheduling device 110 may periodically obtain data related to the completed backup jobs from the job repository, and the data may be, for example, a predicated execution information, an actual execution time, payload, etc. of the backup jobs. Additionally, in some embodiments, the scheduling device 110 may only select backup jobs that have not been used to calculate adjustment parameters.

At 420, the scheduling device 110 determines the adjustment parameters according to the data.

In some embodiments, the scheduling device 110 may set different combinations of adjustment parameters, and then the scheduling device 110 uses a plurality of simulation threads to simultaneously simulate the determination of the execution priority and the execution of the backup job according to the different combinations of adjustment parameters. The determination of the execution priority and execution of the backup job are similar to those described above with reference to FIG. 2 and FIG. 3, except that the simulation thread uses a counter to simulate the execution time according to the actual execution time of the backup job obtained at 410 instead of actually executing the backup job. For each simulation thread, when the simulated execution time of a certain backup job ends, the backup job will be marked as completed or timed out, and then the scheduling device 110 resets the counter, and triggers the simulation thread to execute a new execution priority sorting again, until all backup jobs are completed or time out. As mentioned when describing Equation (2) above, the scheduling device 110 calculates the sum of returned values of each simulation thread according to the execution results of the backup jobs, and finds out a simulation thread with a larger sum of the returned values, and the combination of adjustment parameters corresponding to the simulation thread is a better combination of adjustment parameters.

Additionally, in an embodiment, in order to reduce time complexity, the scheduling device 110 may combine the adjustment parameters by using a progressive algorithm. For example, the scheduling device 110 first selects 0.1 as a step value to combine the adjustment parameters. Then, after finding a better combination of adjustment parameters in the case that the step value is 0.1, the scheduling device 110 continues to select 0.01 as the step value to continue to optimize the combination of adjustment parameters, on the basis of this better combination of adjustment parameters. With this algorithm, the time complexity is $n \times 10^3$ other than $n \times 10^6$.

In the above exemplary embodiments, by periodically updating the adjustment parameters through utilizing more and more data related to the completed backup jobs, the adjustment parameters suitable for a specific backup system are further dynamically optimized, thereby further optimizing the determination of the execution priorities of backup jobs to better achieve the RPO.

Figure 5:
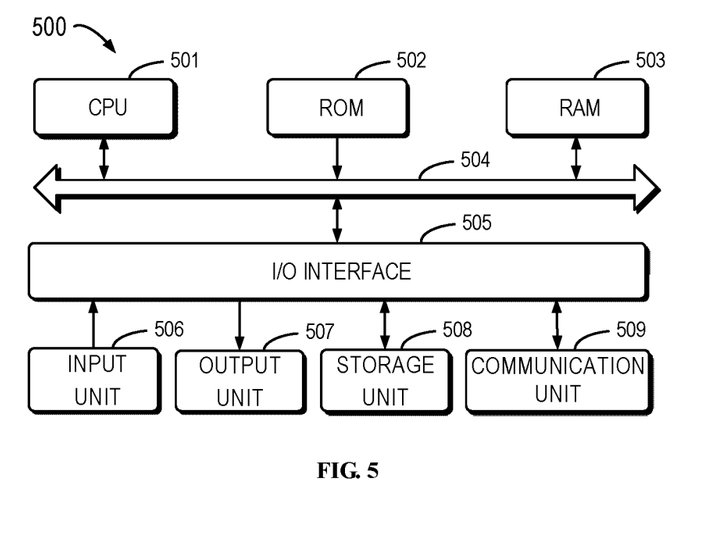
FIG. 5 illustrates a schematic block diagram of an example device that may be used to implement embodiments of the present disclosure.

FIG. 5 shows a schematic block diagram of an example device 500 that may be used to implement embodiments of the present disclosure. For example, the scheduling device 110 shown in FIG. 1 may be implemented by the device 500. As shown in FIG. 5, the device 500 comprises a central processing unit (CPU) 501 which is capable of performing various appropriate acts and processes in accordance with computer program instructions stored in a read only memory (ROM) 502 or computer program instructions loaded from a storage unit 508 to a random access memory (RAM) 503. The RAM 503 stores therein various programs and data required for operations of the device 500. The CPU 501, the ROM 502 and the RAM 503 are connected to one another via a bus 504. An input/output (I/O) interface 505 is also connected to the bus 504.

Multiple components in the device 500 are connected to the I/O interface 505: an input unit 506 including a keyboard, a mouse, or the like; an output unit 507, such as various types of displays, a loudspeaker or the like; a storage unit 508, such as a disk, an optical disk or the like; and a communication unit 509, such as a LAN card, a modem, a wireless communication transceiver or the like. The communication unit 509 allows the device 500 to exchange information/data with other devices via a computer network, such as the Internet, and/or various telecommunication networks.

The above-described procedures and processes such as the methods, 200, 300 and 400 may be executed by the processing unit 501. For example, in some embodiments, the methods 200, 300 and 400 may be implemented as a computer software program, which is tangibly embodied on a machine-readable medium, e.g., the storage unit 508. In some embodiments, part or the entirety of the computer program may be loaded to and/or installed on the device 500 via the ROM 502 and/or the communication unit 509. The computer program, when loaded to the RAM 503 and executed by the CPU 501, may execute one or more acts of the methods 200, 300 and 400 as described above.

The present disclosure may be a method, an apparatus, a system, and/or a computer program product. The computer program product may include a computer readable storage medium (or media) having computer readable program instructions thereon for causing a processor to carry out aspects of the present disclosure.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer readable storage medium that can direct a computer, a programmable data processing apparatus, and/ or other devices to function in a particular manner, such that the computer-readable storage medium having instructions stored therein comprises an article of manufacture including instructions which implement aspects of the functions/acts specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to embodiments disclosed. Many modifications and variations will be apparent to those of ordinary skill in the art without departing from the scope and spirit of the described embodiments. The terminology used herein was chosen to best explain the principles of embodiments, the practical application or technical improvement over technologies found in the marketplace, or to enable others of ordinary skill in the art to understand embodiments disclosed herein.

We claim:

1. A method of scheduling backup jobs, comprising:
    in response to detecting that a target backup job is generated, obtaining predetermined execution information of the target backup job, wherein the predetermined execution information of the target backup job includes a predicated execution duration of the target backup job estimated using an autoregressive integrated moving average (ARIMA) model according to historical data of backup job execution;
    determining an execution priority of the target backup job based on the predetermined execution information of the target backup job;
    determining an execution priority of an existing backup job in a waiting queue; and
    adding the target backup job to the waiting queue based on the execution priority of the existing backup job and the execution priority of the target backup job.

2. The method according to claim 1, wherein obtaining the predetermined execution information of the target backup job comprises:
    obtaining at least one of the following: a predetermined priority and a predetermined execution interval.

3. The method according to claim 1, further comprising:
    in response to determining that there is an available capacity in a backup system for executing backup jobs, determining execution priorities of a plurality of existing backup jobs in the waiting queue;
    sorting the plurality of existing backup jobs based on the execution priorities of the plurality of existing backup jobs;
    removing, based on a result of the sorting, a predetermined number of existing backup jobs from the waiting queue; and
    executing the removed existing backup jobs.

4. The method according to claim 1, wherein determining the execution priority of the target backup job comprises:
    obtaining an adjustment parameter for the predetermined execution information of the target backup job; and
    determining the execution priority of the target backup job based on the predetermined execution information of the target backup job and the adjustment parameter.

5. The method according to claim 4, wherein obtaining the adjustment parameters comprises:
    obtaining data related to completed backup jobs; and
    determining the adjustment parameters based on the data.

6. The method according to claim 1, wherein determining the execution priority of the existing backup job comprises:
    obtaining predetermined execution information of the existing backup job, the predetermined execution information of the existing backup job comprising at least one of the following: a predetermined priority, a predetermined execution interval, and a predicated execution duration of the existing backup job;
    determining a waiting time period of the existing backup job in the waiting queue;
    obtaining adjustment parameters for the waiting time period and the predetermined execution information of the existing backup job; and
    determining the execution priority of the existing backup job based on the waiting time period, the predetermined execution information of the existing backup job, and the adjustment parameters.

7. The method according to claim 1, wherein determining the execution priority of the existing backup job comprises:
    obtaining a predetermined value related to the execution priority of the existing backup job, the predetermined value having been determined through predetermined execution information of the existing backup job;
    determining a waiting time period of the existing backup job in the waiting queue; and
    determining the execution priority of the existing backup job based on the predetermined value and the waiting time period.

8. The method according to claim 1, wherein adding the target backup job to the waiting queue comprises:
    sorting the target backup job and the existing backup job based on the execution priority of the target backup job and the execution priority of the existing backup job; and
    adding, based on a result of the sorting, the target backup job to the waiting queue.

9. An electronic device, comprising:
    at least one processing unit; and
    at least one memory, coupled to the at least one processing unit and storing instructions executed by the at least one processing unit, the instructions, when executed by the at least one processing unit, causing the device to perform acts, the acts comprising:

in response to detecting that a target backup job is generated, obtaining predetermined execution information of the target backup job, wherein the predetermined execution information of the target backup job includes a predicated execution duration of the target backup job estimated using an autoregressive integrated moving average (ARIMA) model according to historical data of backup job execution;

determining an execution priority of the target backup job based on the predetermined execution information of the target backup job;

determining an execution priority of an existing backup job in a waiting queue; and adding the target backup job to the waiting queue based on the execution priority of the existing backup job and the execution priority of the target backup job.

10. The device according to claim 9, wherein obtaining the predetermined execution information of the target backup job comprises:

obtaining at least one of the following: a predetermined priority and a predetermined execution interval.

11. The device according to claim 9, wherein the acts further comprise:

in response to determining that there is an available capacity in a backup system for executing backup jobs, determining execution priorities of a plurality of existing backup jobs in the waiting queue;

sorting the plurality of existing backup jobs based on the execution priorities of the plurality of existing backup jobs;

removing, based on a result of the sorting, a predetermined number of existing backup jobs from the waiting queue; and executing the removed existing backup jobs.

12. The device according to claim 9, wherein determining the execution priority of the target backup job comprises:

obtaining an adjustment parameter for the predetermined execution information of the target backup job; and determining the execution priority of the target backup job based on the predetermined execution information of the target backup job and the adjustment parameter.

13. The device according to claim 12, wherein obtaining the adjustment parameters comprises:

obtaining data related to completed backup jobs; and determining the adjustment parameters based on the data.

14. The device according to claim 9, wherein determining the execution priority of the existing backup job comprises:

obtaining predetermined execution information of the existing backup job, the predetermined execution information of the existing backup job comprising at least one of the following: a predetermined priority, a predetermined execution interval and a predicated execution duration of the existing backup job;

determining a waiting time period of the existing backup job in the waiting queue;

obtaining adjustment parameters for the waiting time period and the predetermined execution information of the existing backup job; and determining the execution priority of the existing backup job based on the waiting time period, the predetermined execution information of the existing backup job, and the adjustment parameters.

15. The device according to claim 9, wherein determining the execution priority of the existing backup job comprises:

obtaining a predetermined value related to the execution priority of the existing backup job, the predetermined value having been determined through predetermined execution information of the existing backup job;

determining a waiting time period of the existing backup job in the waiting queue; and determining the execution priority of the existing backup job based on the predetermined value and the waiting time period.

16. The device according to claim 9, wherein adding the target backup job to the waiting queue comprises:

sorting the target backup job and the existing backup job based on the execution priority of the target backup job and the execution priority of the existing backup job; and adding, based on a result of the sorting, the target backup job to the waiting queue.

17. A computer program product tangibly stored on a non-transitory computer-readable medium and comprising machine-executable instructions, the machine-executable instructions, when executed by a device, cause the device to perform operations, the operations comprising:

in response to detecting that a target backup job is generated, obtaining predetermined execution information of the target backup job, wherein the predetermined execution information of the target backup job includes a predicated execution duration of the target backup job estimated using an autoregressive integrated moving average (ARIMA) model according to historical data of backup job execution;

determining an execution priority of the target backup job based on the predetermined execution information of the target backup job;

determining an execution priority of an existing backup job in a waiting queue; and adding the target backup job to the waiting queue based on the execution priority of the existing backup job and the execution priority of the target backup job.

18. The computer program product according to claim 17, wherein obtaining the predetermined execution information of the target backup job comprises:

obtaining at least one of the following: a predetermined priority and a predetermined execution interval.

19. The computer program product according to claim 17, wherein the operations further comprise:

in response to determining that there is an available capacity in a backup system for executing backup jobs, determining execution priorities of a plurality of existing backup jobs in the waiting queue;

sorting the plurality of existing backup jobs based on the execution priorities of the plurality of existing backup jobs;

removing, based on a result of the sorting, a predetermined number of existing backup jobs from the waiting queue; and executing the removed existing backup jobs.

20. The computer program product according to claim 17, wherein determining the execution priority of the target backup job comprises:

obtaining an adjustment parameter for the predetermined execution information of the target backup job; and determining the execution priority of the target backup job based on the predetermined execution information of the target backup job and the adjustment parameter.

* * * * *